United States Patent
Skinner et al.

(10) Patent No.: US 9,816,476 B2
(45) Date of Patent: Nov. 14, 2017

(54) IGNITION SYSTEM FOR SPARK IGNITION ENGINES AND METHOD OF OPERATING SAME

(71) Applicant: DELPHI TECHNOLOGIES, INC., Troy, MI (US)

(72) Inventors: Albert A. Skinner, Waterford, MI (US); Salah Derrouich, Ypsilanti, MI (US); Frank Lorenz, Alflen (DE)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 14/905,425

(22) PCT Filed: Jul. 14, 2014

(86) PCT No.: PCT/US2014/046467
§ 371 (c)(1),
(2) Date: Jan. 15, 2016

(87) PCT Pub. No.: WO2015/009594
PCT Pub. Date: Jan. 22, 2015

(65) Prior Publication Data
US 2016/0160832 A1    Jun. 9, 2016

Related U.S. Application Data

(60) Provisional application No. 61/847,125, filed on Jul. 17, 2013.

(51) Int. Cl.
| | |
|---|---|
| *F02P 3/045* | (2006.01) |
| *H01F 38/12* | (2006.01) |
| *F02P 9/00* | (2006.01) |
| *F02P 3/04* | (2006.01) |
| *F02P 5/15* | (2006.01) |
| *H01F 27/28* | (2006.01) |
| *H01T 15/00* | (2006.01) |
| *H01T 13/50* | (2006.01) |

(52) U.S. Cl.
CPC ............. *F02P 9/002* (2013.01); *F02P 3/0442* (2013.01); *F02P 5/1502* (2013.01);
(Continued)

(58) Field of Classification Search
CPC .......... F02P 3/02; F02P 3/0442; F02P 5/1502; F02P 9/002; H01F 27/2823; H01F 38/12;
(Continued)

(56) References Cited

U.S. PATENT DOCUMENTS 3,854,466 A * 12/1974 Steinberg .............. F02P 3/0552
                                                        123/618
4,245,594 A * 1/1981 Morino .................. F02P 9/002
                                                        123/606
(Continued)

*Primary Examiner* — John Kwon
*Assistant Examiner* — Johnny H Hoang
(74) *Attorney, Agent, or Firm* — Joshua M. Haines

(57) ABSTRACT

An ignition coil system is configured for use with a spark ignition internal combustion engine. The system includes a first switching circuit electrically connected to the primary coil that provides electrical power to the primary coil. The system includes a second switching circuit connected to the primary coil that is configured to short the terminals of the primary coil after the secondary current has been induced in the secondary coil, whereby the secondary coil induces a current in the primary coil, thereby reducing the secondary current in the secondary wire coil. A controller in communication with the first and second switching circuits is configured to receive a single electronic spark timing (EST) signal and to control the conductive states and the non-conductive states of the first and second switching circuits based on this single EST signal.

25 Claims, 9 Drawing Sheets

(52) U.S. Cl.
CPC ......... *H01F 27/2823* (2013.01); *H01T 15/00* (2013.01); *H01F 38/12* (2013.01); *H01T 13/50* (2013.01); *Y02T 10/46* (2013.01)

(58) Field of Classification Search
CPC ........... H01F 2038/12; H01F 2038/122; H01F 2038/127; H01T 15/00; Y02T 10/46
USPC ..... 123/621, 632, 634, 650; 336/92, 96, 228
See application file for complete search history.

(56) References Cited

U.S. PATENT DOCUMENTS

| | | | | |
|---|---|---|---|---|
| 4,328,771 | A * | 5/1982 | Kawai | F02P 15/12 123/179.5 |
| 6,557,537 | B2 * | 5/2003 | Ikeda | F02P 3/0838 123/606 |
| 6,662,792 | B2 * | 12/2003 | Dutt | F02P 15/10 123/598 |
| 6,725,834 | B2 * | 4/2004 | Yorita | G01L 23/221 123/406.29 |
| 7,100,589 | B2 * | 9/2006 | Toriyama | F02P 3/06 123/604 |
| 7,121,270 | B1 * | 10/2006 | Plotnikov | F02P 15/10 123/604 |
| 7,404,396 | B2 * | 7/2008 | Toriyama | F02P 3/0552 123/598 |
| 7,730,880 | B1 * | 6/2010 | Nagai | F02P 3/096 123/598 |
| 2010/0132677 | A1 * | 6/2010 | Skinner | H01F 1/24 123/621 |

* cited by examiner

IGNITION SYSTEM FOR SPARK IGNITION ENGINES AND METHOD OF OPERATING SAME

CROSS REFERENCE TO RELATED APPLICATIONS

This application is a national stage application under 35 USC 371 of PCT Application No. PCT/US2014/046467 having an international filing date of Jul. 14, 2014, which is designated in the United States and which claimed the benefit of U.S. Provisional Patent Application No. 61/847,125 filed on Jul. 17, 2013, the entire disclosures of each are hereby incorporated by reference in their entirety.

TECHNICAL FIELD OF THE INVENTION

The invention generally relates to an ignition system for a spark ignition internal combustion engine, and more particularly relates to an ignition system having an output with high initial current and long spark duration.

BACKGROUND OF THE INVENTION

Modern spark ignition internal combustion engines typically require high ignition spark energy to initiate combustion. It has been found that a high initial secondary current from the ignition coil to the spark plug is beneficial for robust combustion initiation. It has also been found that a long duration spark caused by a lower secondary current is needed for enhanced repeatability (e.g. poor timing of air-fuel mixture). One approach to solving this problem has been using two ignition coils and combining the coil outputs while isolating the ignition coils from each other using high voltage diodes. Another problem with the delivery of very high spark energy is spark plug electrode wear. The dual coil system allows disabling one of the coils when not needed in order to reduce spark plug electrode erosion. Also, the electrode erosion of the full output of the dual coil system is less than a traditional system with the same peak secondary current and burn time since the combined output of the two coils yields a concave secondary current waveform that has a lower secondary current over time than the typical triangular waveform. Electrode erosion is proportional to this integral secondary current. A drawback of the dual coil system is additional cost of another ignition coil and two high voltage blocking diodes. Another concern with the dual coil system is unknown durability, due to the inclusion of high voltage blocking diodes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, an ignition coil is provided. The ignition coil includes a central core, a primary wire coil wound about the central core, a secondary wire coil wound about the central core, a first switching circuit electrically connected to the primary wire coil and configured to be connected to an electrical power source, a second switching circuit electrically connected to the primary wire coil, and a controller in electrical communication with the first and second switching circuits. A first electrical current from the electrical power source flows through the primary wire coil when the first switching circuit is in a conductive state and the first electrical current does not flow through the primary wire coil when the first switching circuit is in a non-conductive state. A second electrical current is induced in the primary wire coil by a third current in the secondary wire coil when the first switching circuit is in a non-conductive state and the second switching circuit is in a conductive state, thereby reducing the third current in the secondary wire coil. The controller is configured to receive a single switching signal and to control the conductive states and the non-conductive states of the first and second switching circuits based on the single switching signal.

According to one embodiment, the controller is configured to determine a first transition of the single switching signal from a first state to a second state and to determine a second transition of the single switching signal from the second state to the first state when a first time period has elapsed. The controller switches the first switching circuit to the conductive state after the first transition and the controller switches the first switching circuit to the non-conductive state after the second transition. The controller is configured to determine a third transition of the single switching signal from the first state to the second state when a second time period has elapsed and determine a fourth transition of the single switching signal from the second state to the first state when a third time period has elapsed. The controller switches the second switching circuit to the conductive state after the fourth transition and the controller switches the second switching circuit to the non-conductive state after a fourth time period has elapsed. The first time period is twenty to eighty times longer than the third time period.

According to one embodiment, the controller is configured to produce a delayed switching signal based upon the single switching signal that is time delayed relative to the single switching signal by a fifth time period. The controller is configured to determine a first transition of the delayed switching signal from a first state to a second state and determine a second transition of the delayed switching signal from the second state to the first state when the first time period has elapsed. The controller switches the first switching circuit to the conductive state when the single switching signal and the delayed switching signal are in the second state and the controller switches the first switching circuit to the non-conductive state after the single switching signal and the delayed switching signal return to the first state. The controller is configured to determine a third transition of the delayed switching signal from the first state to the second state when the second time period has elapsed and determine a fourth transition of the delayed switching signal from the second state to a second state when the third time period has elapsed. The controller switches the second switching circuit to the conductive state after the fourth transition of the single switching signal and after the third transition of the delayed switching signal and the controller switches the second switching circuit to the non-conductive state after the fourth time period has elapsed. The controller switches the second switching circuit to the conductive state after the third transition only when the single switching signal is in the first state.

According to one embodiment, the controller is configured to determine a current in the primary wire coil and the controller switches the second switching circuit to the non-conductive state when the current in the primary wire coil exceeds a current threshold.

According to one embodiment, the central core has a generally cylindrical shape and is formed of laminated electrical steel, such as electrical silicon steel. According to one embodiment, the ignition coil system further includes a magnetic return path at least partially surrounding the central core, the primary wire coil, and the secondary wire coil are formed of a material having a relative magnetic permeability value between 100 and 500. A portion of the magnetic return path is in direct and intimate contact with each end of the central core. The magnetic return path may be formed of a composite iron material consisting essentially of iron particles and a dielectric binder, such as a material consisting of 98% iron particles and 2% dielectric binder by weight, wherein the dielectric binder is an epoxy resin.

In another embodiment of the present invention, a method of controlling an ignition coil system configured for use with a spark ignition internal combustion engine is provided. The ignition coil system has a central core, a primary wire coil wound about the central core, a secondary wire coil wound about the central core, a first switching circuit electrically connected to the primary wire coil and configured to be connected to an electrical power source. A first electrical current from the electrical power source flows through the primary wire coil when the first switching circuit is in a conductive state and the first electrical current does not flow through the primary wire coil when the first switching circuit is in a non-conductive state. A second switching circuit is electrically connected to the primary wire coil. A second electrical current is induced in the primary wire coil by a third current in the secondary wire coil when the first switching circuit is in a non-conductive state and the second switching circuit is in a conductive state, thereby reducing the third current in the secondary wire coil. The ignition coil system also has a controller in electrical communication with the first and second switching circuits. The controller is configured to receive a single switching signal and to control the conductive states and the non-conductive states of the first and second switching circuits based on said single switching signal. The method includes the steps of providing said ignition coil system, providing said single switching signal to said ignition coil system, and detecting a first transition of the single switching signal from a first state to a second state. The method also includes the steps of switching the first switching circuit to the conductive state, detecting a second transition of the single switching signal from the second state to the first state after the elapse of a first time period, and switching the first switching circuit to the non-conductive state after the second transition. The method further includes the steps of detecting a third transition of the single switching signal from the first state to the second state after the elapse of a second time period, detecting a fourth transition of the single switching signal from the second state to the first state when a third time period has elapsed, switching the second switching circuit to the conductive state after the fourth transition, and switching the second switching circuit to the non-conductive state after a fourth time period has elapsed.

According to another embodiment, the method further includes the steps of producing a delayed switching signal based upon the single switching signal that is time delayed relative to the single switching signal by a fifth time period, detecting a first transition of the delayed switching signal from a first state to a second state, switching the first switching circuit to the conductive state when the single switching signal and the delayed switching signal are in the second state, detecting a second transition of the delayed switching signal from the second state to the first state when the first time period has elapsed, and switching the first switching circuit to the non-conductive state after the single switching signal and the delayed switching signal return to the first state. The method additionally includes the steps of detecting a third transition of the delayed switching signal from the first state to the second state when the second time period has elapsed, switching the second switching circuit to the conductive state after the fourth transition of the single switching signal and after the third transition of the delayed switching signal, and switching the second switching circuit to the non-conductive state after the fourth time period has elapsed.

The method may further include the steps of detecting a current in the primary wire coil and switching the second switching circuit to the non-conductive state when the current in the primary wire coil exceeds a current threshold.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Presented herein is an ignition coil system for a spark ignition engine that provides a high peak current and extended spark duration with a single secondary coil that is desired in some cold start conditions. The current and burn time of this ignition coil system is very similar to the output current provided by a dual ignition coil system with two secondary coils. The ignition coil is charged to full output to obtain the high peak secondary current. However, the trailing secondary current that provides a longer burn time may be truncated by an electronic controller circuit to limit spark plug electrode erosion when engine operating condition do not require the extended spark duration.

Figure 1:
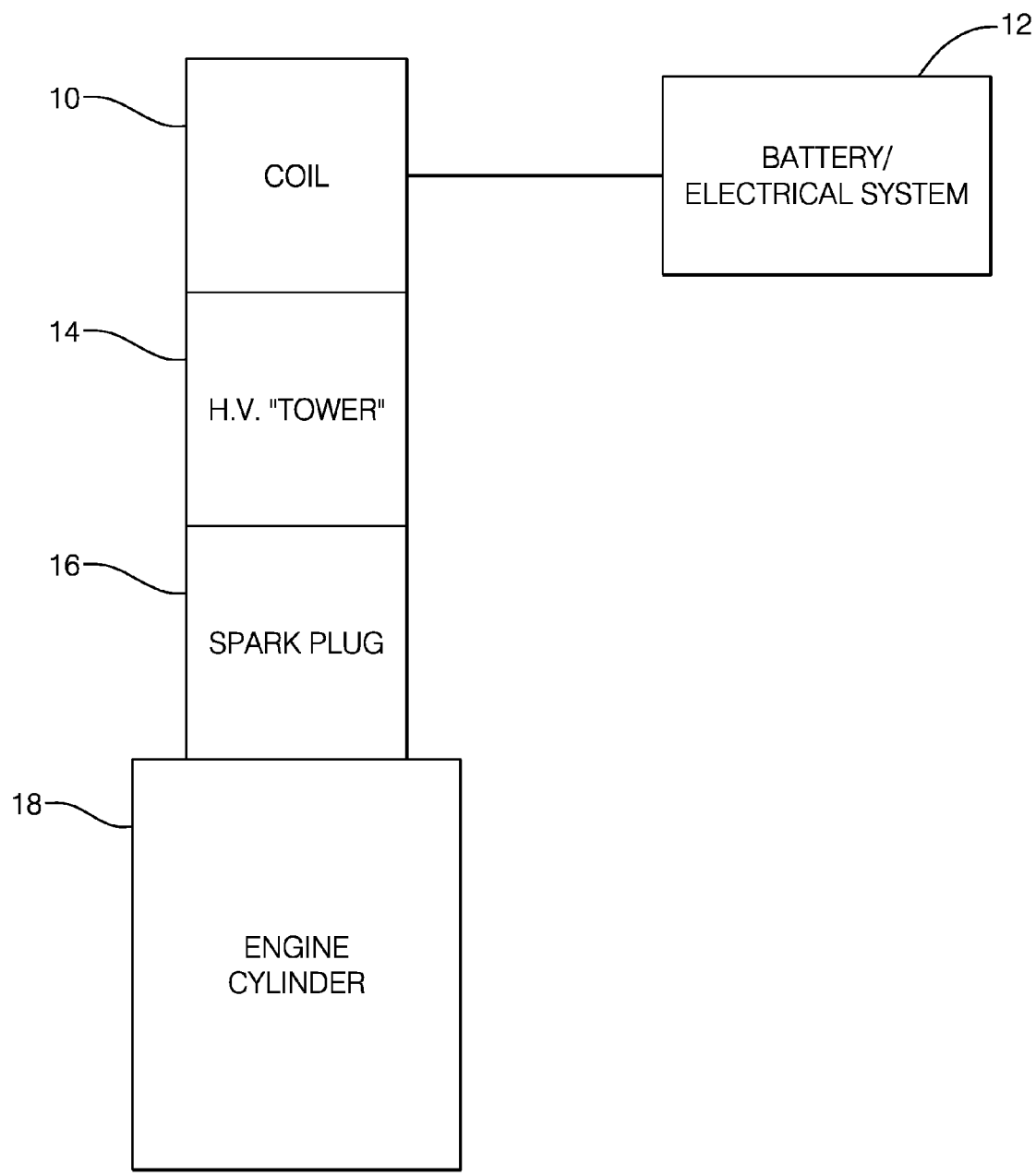
FIG. 1 is a schematic block diagram of an ignition coil system in an intended environment in accordance with a first embodiment.

Referring initially to FIG. 1, an ignition coil system is shown, generally designated 10, which can receive electrical power from a battery/electrical distribution system 12 of a vehicle and which can be coupled through a so-called "high voltage tower" 14 (HV tower) to one or more spark plugs 16, to provide a combustion initiating spark inside an engine cylinder 18. The HV tower 14 may include, without limitation, a cup and spring arrangement.

Figure 2A:
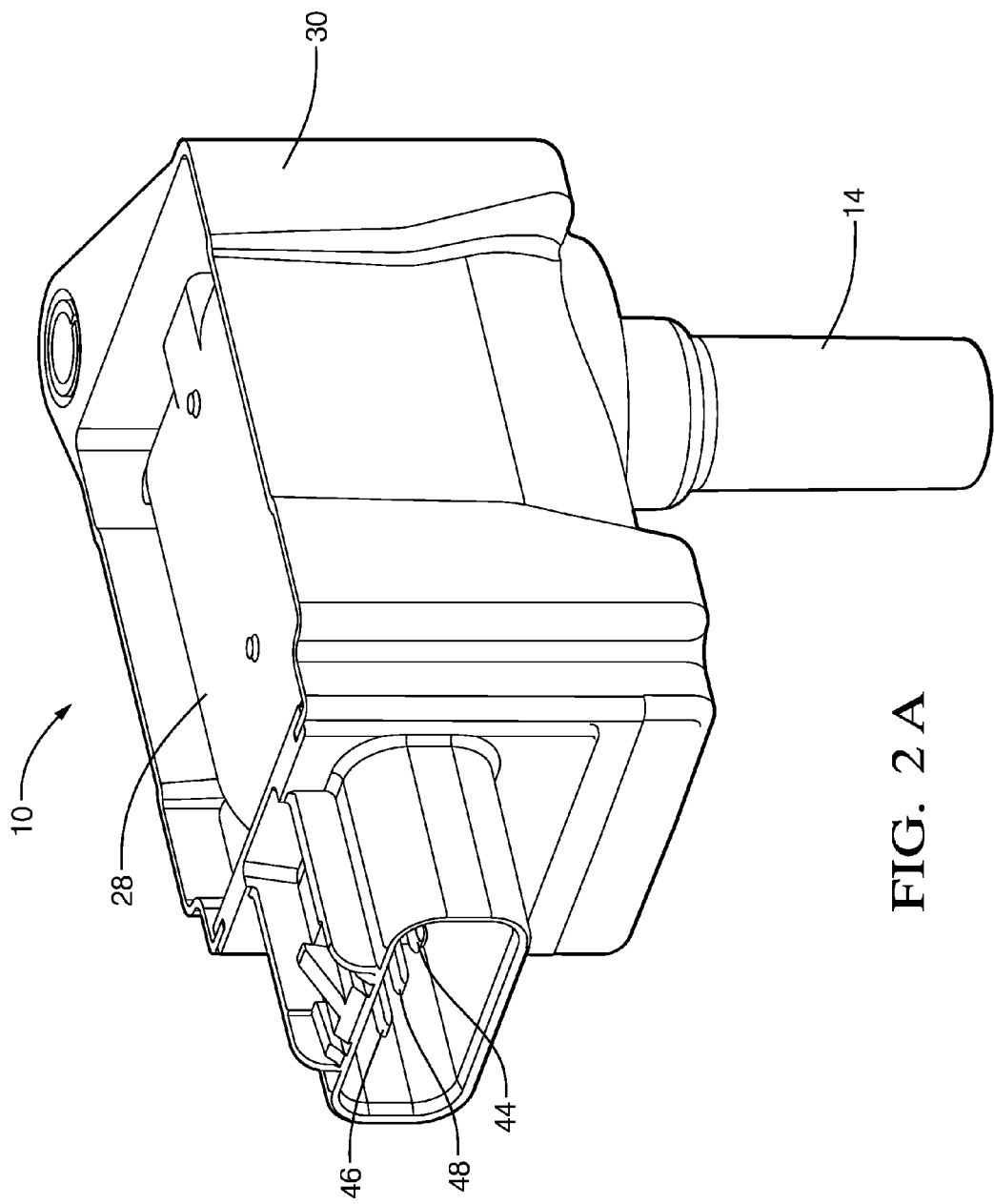
FIG. 2A is a perspective side view of an ignition coil system in accordance with the first embodiment.
Figure 2:
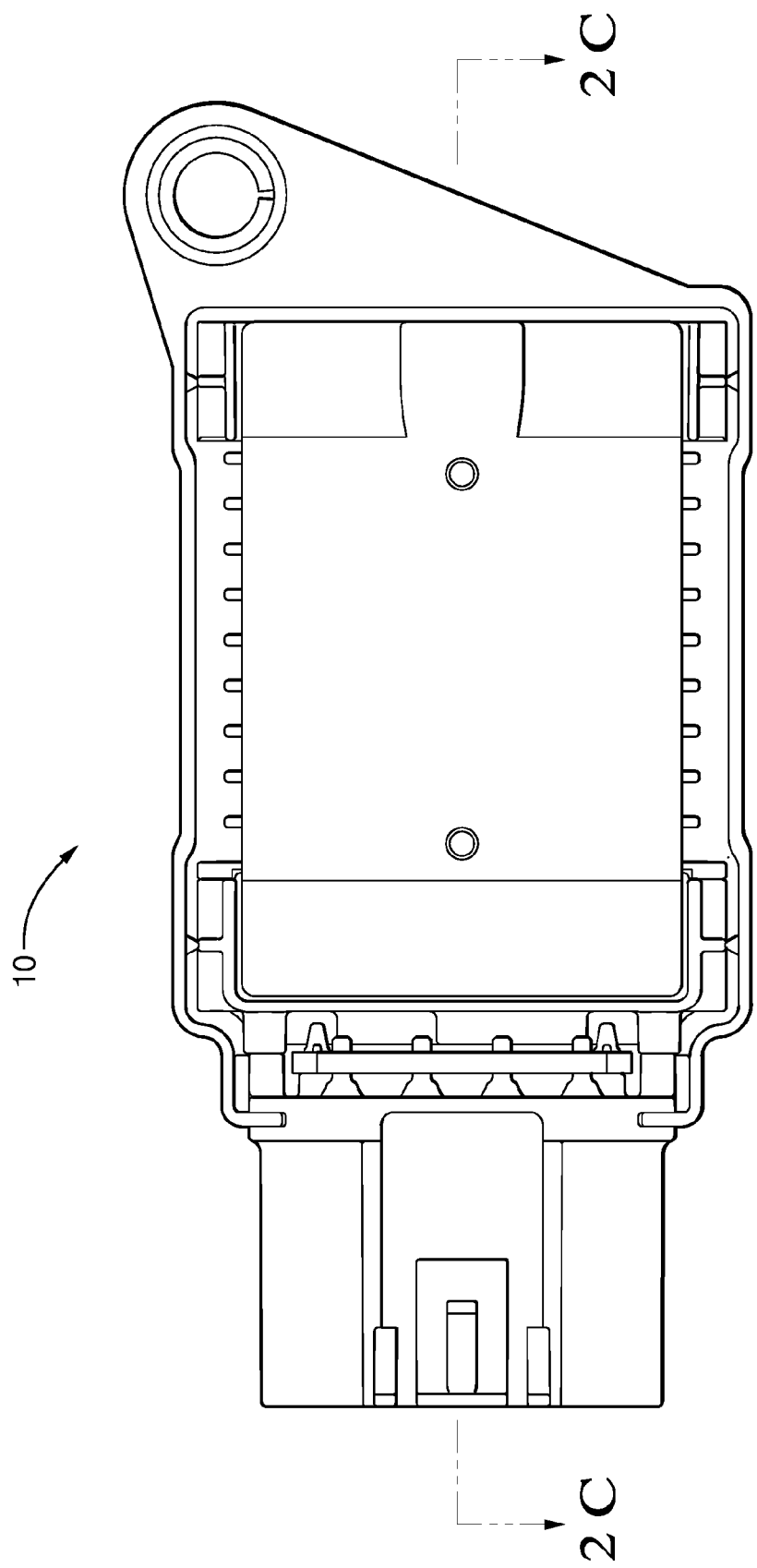
FIG. 2B is a top view of the ignition coil system of FIG. 2A in accordance with the first embodiment.
FIG. 2C is a cross section view of the ignition coil system of FIG. 2A in accordance with the first embodiment.
Figure 2C:
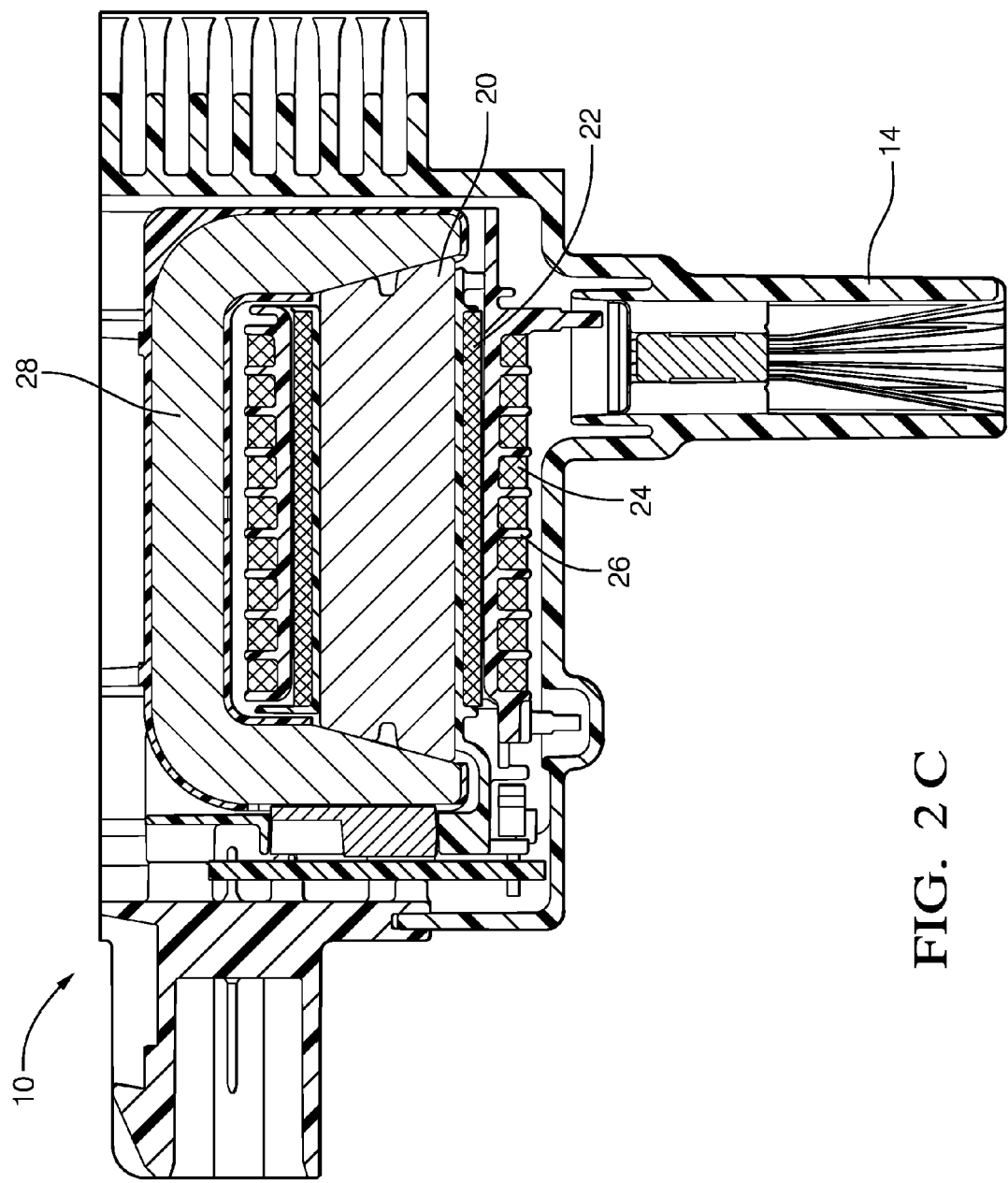
Figure 3:
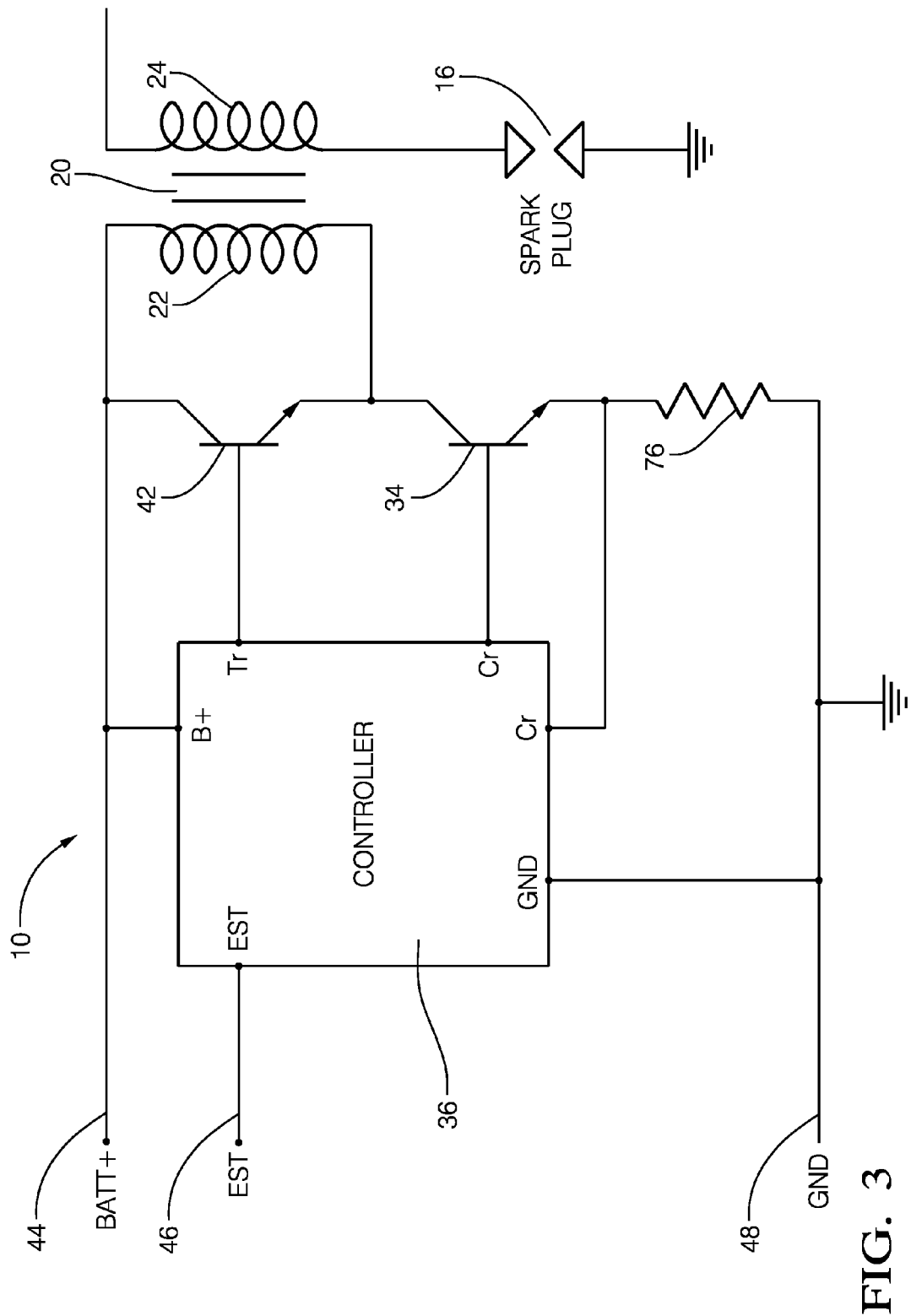
FIG. 3 is an electrical schematic diagram of an ignition coil system accordance with the first embodiment.
Figure 4:
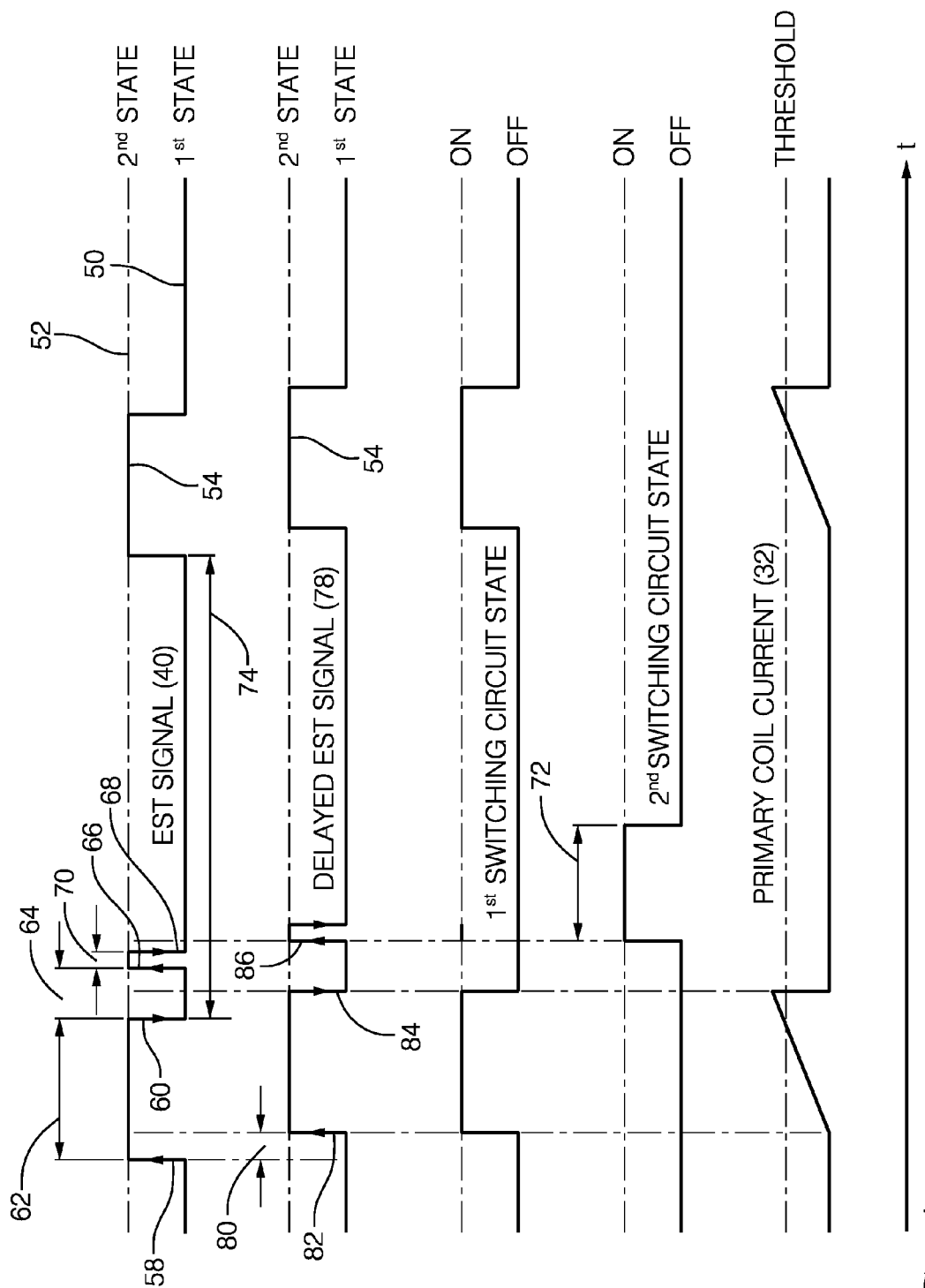
FIG. 4 is a signal timing diagram of an electronic spark timing signal in relation to the conductive states of a first and second switching circuit and a primary coil current in accordance with the first embodiment.

Cross-referencing FIGS. 2-4, details of a non-limiting example of the ignition coil system 10 can be seen, it being understood that various elements such as circuit boards, etc. which typically are included in ignition coils are omitted for clarity. As seen in FIGS. 2A-2C, the system 10 includes a central core 20, a primary wire coil 22 wound about the central core 20, and a secondary wire coil 24 wound about a hollow spool 26 that contains the central core 20 and the primary wire coil 22. The central core 20, primary wire coil 22, and secondary wire coil 24 are hereinafter referred to as the core 20, primary coil 22, and secondary coil 24 respectively.

The core 20 has a generally cylindrical shape and is formed of laminated electrical steel, for example 50A800 electrical silicon steel. The system 10 further includes a magnetic return path 28, such as a case 28 configured to at least partially surround the core 20, the primary coil 22, and the secondary coil 24. The case 28 is contained within an insulative housing 30. The case 28 is formed of a material having a relative magnetic permeability value between 100 and 500, such as a composite iron material consisting essentially of iron particles and a dielectric binder such as an epoxy resin. The binder in the composite iron is magnetically equivalent to air and so provides the equivalent of a distributed air gap. There is no actual air gap defined between the core 20 and the return path 28. A portion of the case 28 is in direct and intimate contact with each end of the core 20. By making the case 28 of a material having a relative magnetic permeability value between 100 and 500, the need for a second pole piece and a shield are eliminated, meaning that no magnetic shield is provided on the inside or outside surface of the case 28. Accordingly, the case 28 is preferably electrically grounded. An ignition coil having such a magnetic return path is described in U.S. Patent Application Publication No. 2010/0253202, the entire disclosure of which is hereby incorporated herein by reference.

Thus, the ignition coil of the system 10 has overall low magnetic permeability with a high range of magnetizing force over which this magnetic permeability is fairly constant. Therefore, when the core permeability is near "saturation", the return path 28 is still in the nearly linear portion of the magnetization (BH, hysteresis) curve. As energy is stored in the distributed air gap of the return path 28, the level of magnetic flux follows the magnetization characteristics of the core 20. Since the return path 28 is operated over a fairly linear portion of the magnetization curve, the overall flux path does not substantially change as the core 20 approaches saturation. Therefore, the magnetic coupling stays fairly constant and the output secondary current mimics the magnetization characteristics of the core 20. The inventors have discovered that a return path 28 formed of a composite iron material containing 98% iron particles and 2% binder by weight have yielded satisfactory performance for providing a linear response.

As illustrated in the schematic electrical diagram of one embodiment in FIG. 3, the primary coil 22 is electrically connected to an electrical power source, such as the vehicle electrical system or battery 12. The electrical current from the battery 12 flowing through the primary coil 22, hereinafter referred to as the primary current 32, is controlled by a first switching circuit 34, hereafter referred to as a first switch 34, such as an insulated gate bipolar transistor (IGBT). The collector terminal of the IGBT is connected to the primary coil 22 and the emitter terminal is connected to ground. The first switch 34 is turned on and off by an electronic controller 36, for example by an output terminal if the controller 36 connected to the gate terminal of the IGBT. The controller 36 turns the first switch 34 on and off based on an electronic spark timing (EST) signal 40 received from an engine sensor or an electronic engine unit (ECU) (not shown). When the first switch 34 is in a conducive state, hereinafter referred to as "turned on", the primary current 32 from the battery 12 flows through the primary coil 22 to ground, thus generating a magnetic field. When the first switch 34 is in a non-conducive state, hereinafter referred to as "turned off", the primary current 32 through the primary coil 22 stops and the magnetic field collapses, inducing a secondary current in the secondary coil 24. Because the secondary coil 24 contains many more turns than the primary coil 22, the voltage generated in the secondary coil 24 is higher than the primary coil 22. The secondary coil 24 is connected to the spark plug 16 via the HV tower 14 and the high voltage induced in the secondary coil 24 generates a plasma bridge, or spark between the electrodes of the spark plug 16.

In order to limit the duration of the spark generated by the ignition coil, the system 10 includes a second switching circuit 42, hereafter referred to as the second switch 42, electrically connected to each terminal of the primary coil 22. The second switch 42 may also be implemented by an IGBT, although other electrically controlled switching devices, such as bipolar junction transistors, metal oxide semiconductor field effect transistors, electromechanical relays, or the like may be used as the first and/or second switches 34, 42. The second switch 42 is also controlled by the controller 36. The second switch 42 is turned off while the first switch 34 is supplying primary current 32 to the primary coil 22 and for an initial period after the current is induced in the secondary coil 24. After the secondary current is induced in the secondary coil 24, the controller 36 switches the second switch 42 on, thus shorting the terminals of the primary coil 22 and thereby inducing another primary current 32 in the primary coil 22. Without subscribing to any particular theory of operation, the energy transferred from the secondary coil 24 to the primary coil 22 by the induced primary current 32 reduces the secondary current in the secondary coil 24 and limits the duration of the spark.

The controller 36 may be configured to control both the first switch 34 and the second switch 42 based on a single EST signal 40 rather than a separate signal to control the first switch 34 and a separate signal to control the second switch 42, thus eliminating the need for at least one wire to the controller 36 to carry the additional signal. As shown in FIGS. 3 and 4, the ignition control system only requires three inputs, BATT+ input 44 connected to the battery 12, EST input 46 carrying the EST signal 40 and connected to the engine sensor or ECU and GND input 48 connected to the electrical ground. Therefore, as shown in FIG. 2A, the ignition coil system 10 only requires three electrical terminals.

The controller 36 may include a microprocessor, application specific integrated circuit (ASIC), or may be built from discrete logic and timing circuits (not shown). Software instructions that program the controller 36 to control the first and second switches 34, 42 may be stored in a non-volatile (NV) memory device (not shown). The memory device may be contained within the microprocessor or ASIC or it may be a separate device. Non-limiting examples of the types of NV memory that may be used include electrically erasable programmable read only memory (EEPROM), masked read only memory (ROM) and flash memory. The controller 36 may also include analog to digital (A/D) convertor circuits and digital to analog (D/A) convertor circuits (not shown) to allow the controller 36 to establish electrical communication with other electronic devices, such as the ECU. The controller 36 may be integral to the ignition coil or may be located remotely from the ignition coil.

As illustrated in FIG. 4, the EST signal 40 transitions from a first (e.g. low voltage) state 50 to a second (e.g. high voltage) state 52. The EST signal 40 has pulses having two different durations. The first longer duration pulse 54 controls the first switch 34 while the second shorter duration pulse 56 controls the second switch 42. The controller 36 detects a first transition 58 of the EST signal 40 from the first state 50 to the second state 52 and detects a second transition 60 of the EST signal 40 from the second state 52 to the first state 50 when the first time period 62 of the first pulse 54 has elapsed, e.g. 1 to 5 milliseconds (ms). The controller 36 switches the first switch 34 on after the first transition 58 of the EST signal 40 and the controller 36 switches the first switch 34 off after the second transition 60 of the EST signal 40.

If, within a second time period 64 following the second transition 60 of the EST signal 40, the controller 36 detects a third transition 66 of the EST signal 40 from the first state 50 to the second state 52 and a fourth transition 68 of the EST signal 40 from the second state 52 to the first state 50 when the third time period 70 of the second pulse 56 has elapsed, e.g. 25 to 100 microseconds (μs), the controller 36 will switch the second switch 42 on after the fourth transition 68 of the EST signal 40 and the controller 36 switches the second switch 42 off after a fourth time period 72 has elapsed, e.g. 1 to 5 ms. If the controller 36 does not detect the third and fourth transitions 66, 68 of the EST signal 40 within the second time period 64, the second switch 42 remains off as shown in FIG. 4. It may be desirable to have the duration of the first pulse 54 twenty to eighty times longer than the duration of the second pulse 56 to provide easier discrimination of the pulses 54, 56 by the controller 36.

After a fifth time period 74 following the second transition 60 of the EST signal 40, for example 10 to 15 ms, the controller 36 is enabled to detect another first transition 58 of the EST signal 40.

To avoid inadvertently shorting the battery 12 to ground, the ignition coil system 10 may include a resistor 76 in the primary coil 22 circuit so that the controller 36 can detect the primary current 32 in the primary coil 22 and inhibit switching of the second switch 42 from off to on when the primary current 32 is detected.

Because the duration of the second pulse 56 of the EST signal 40 is so short (e.g. 25 to 100 μs), the system 10 may be susceptible to electrical noise in the EST signal 40 that could cause a false trigger of the second switch 42. Therefore, the controller 36 may be configured to produce a delayed EST signal 78 that is based upon the EST signal 40 and is time delayed relative to the EST signal 40 by a fixed sixth time period 80, for example 100 to 200 μs. The delayed EST signal 78 may be a time delayed copy of the EST signal 40 having the same first and second pulses 54, 56 with the same first and second durations as the EST signal 40.

The controller 36 detects a first transition 82 of the delayed EST signal 78 from the first state 50 to the second state 52 and detects a second transition 84 of the delayed EST signal 78 from the second state 52 to the first state 50 when the time period of the first pulse 54 of the delayed EST signal 78 has elapsed. The controller 36 switches the first switch 34 on when both the EST signal 40 and the delayed EST signal 78 are in the second state 52, i.e. after the first transition 58 of the EST signal 40 and the first transition 82 of the delayed EST signal 78, and the controller 36 switches the first switch 34 off after both the EST signal 40 and the delayed EST signal 78 return to the first state 50, i.e. after the second transition 60 of the EST signal 40 and the second transition 84 of the delayed EST signal 78.

If, after the second transition 60 of the EST signal 40 and within the second time period 64 following the second transition 84 of the delayed EST signal 78, the controller 36 detects a third transition 86 of the delayed EST signal 78 from the first state 50 to the second state 52, the controller 36 will switch the second switch 42 on after the third transition 86 of the delayed EST signal 78 and the controller 36 will switch the second switch 42 off after the fourth time period 72 has elapsed. If the controller 36 does not detect the third transition 86 of the delayed EST signal 78 within the second time period 64, the second switch 42 remains off.

Figure 5:
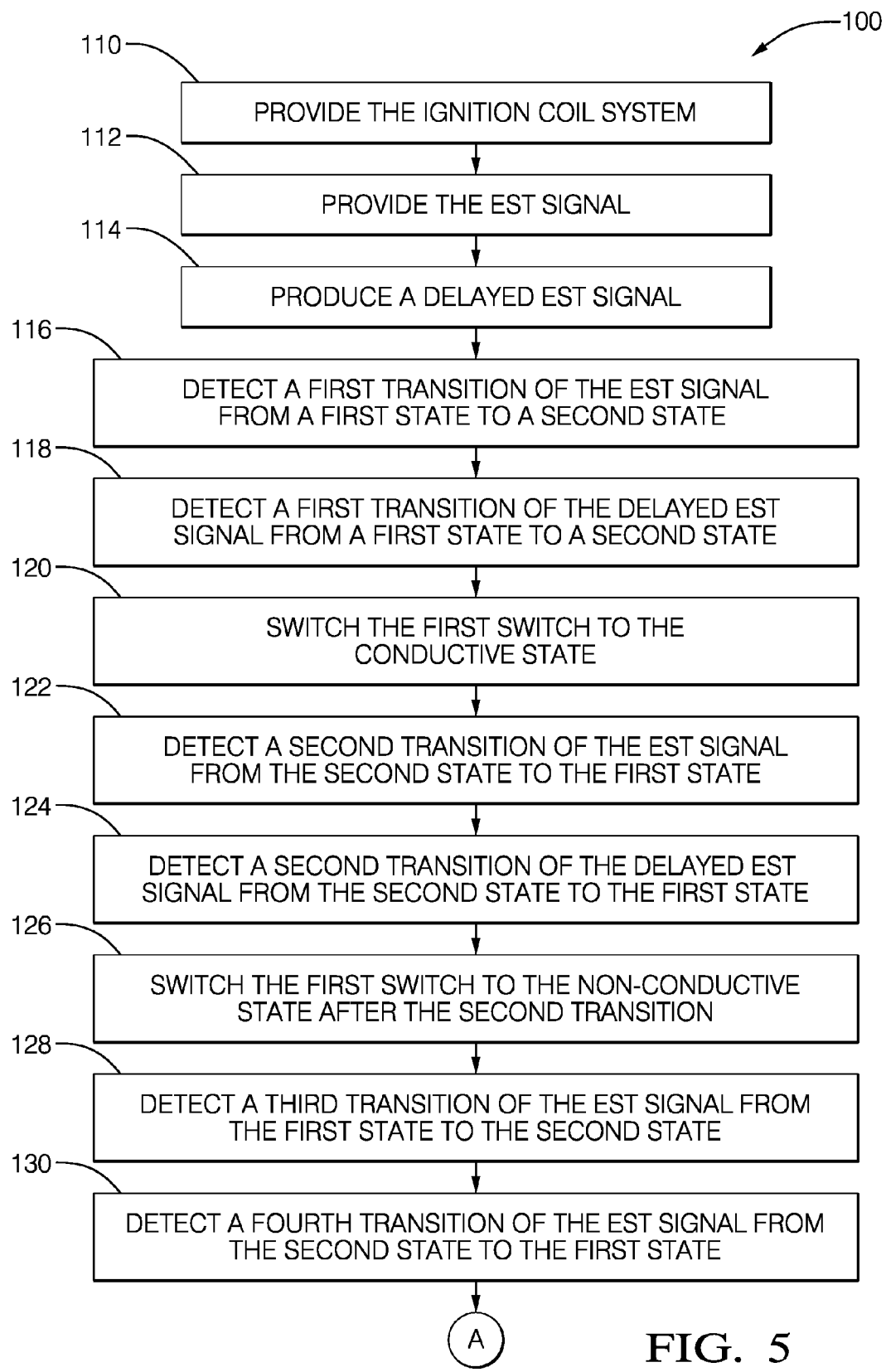
FIG. 5 is a flow chart diagram of a method of controlling an ignition coil system in accordance with the first embodiment.
Figure 5:
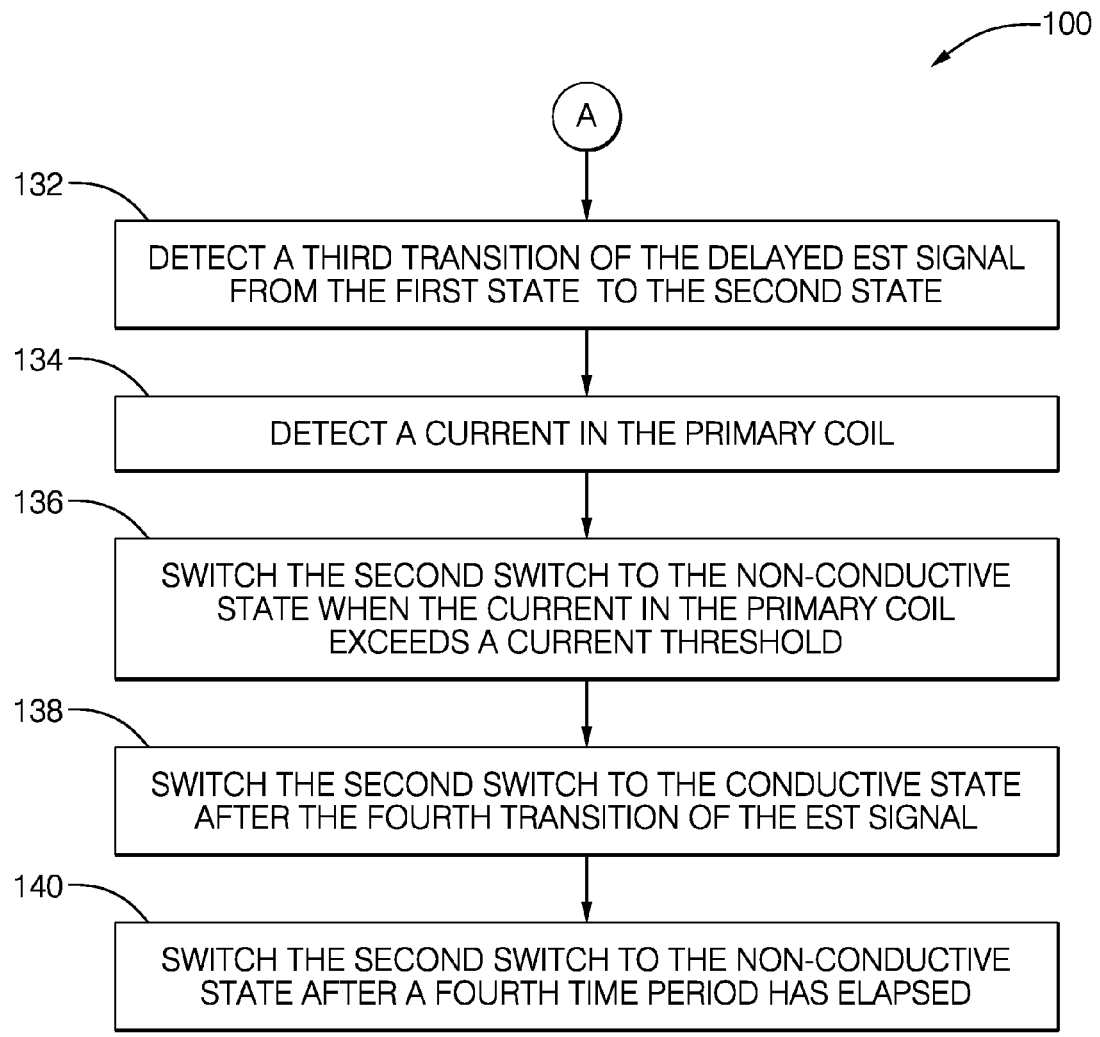

FIG. 5 illustrates a non-limiting method 100 of controlling an ignition coil system 10 configured for use with a spark ignition internal combustion engine. The method 100 includes the following steps.

STEP 110, PROVIDE THE IGNITION COIL SYSTEM, includes providing an ignition coil system 10 having a central core 20, a primary coil 22 wound about the central core 20, a secondary coil 24 wound about the central core 20, a return path 28, a first switch 34 electrically connected to the primary coil 22 and a battery 12. A first primary current 32 from the battery 12 flows through the primary coil 22 when the first switch 34 is in a conductive state and the first primary current 32 does not flow through the primary coil 22 when the first switch 34 is in a non-conductive state. The ignition coil system 10 also includes a second switch 42 that is electrically connected to the primary coil 22. A second primary current is induced in the primary coil 22 by a secondary current in the secondary coil 24 when the first switch 34 is in a non-conductive state and the second switch 42 is in a conductive state. The second primary current 32 reduces the secondary current in the secondary coil 24. The ignition coil system 10 further includes a controller 36 in electrical communication with the first and second switches 34, 42. The controller 36 is configured to receive an EST signal 40 and to control the conductive states and the non-conductive states of both the first and second switches 34, 42 based on the EST signal 40.

STEP 112, PROVIDE THE EST SIGNAL, includes providing an electrical EST signal 40 to the ignition coil system 10. The EST signal 40 is provided to the ignition coil system 10 by an ECU or discrete engine speed sensor, such as an electronic crankshaft position sensor.

STEP 114, PRODUCE A DELAYED EST SIGNAL, is an optional step that includes producing a delayed EST signal 78 based upon the EST signal 40. The delayed EST signal 78 is time delayed relative to the EST signal 40 by the sixth time period 80. The delayed EST signal 78 is a time delayed copy of the EST signal 40 that may be produced by one of various well known means of time delaying electrical signals.

STEP 116, DETECT A FIRST TRANSITION OF THE EST SIGNAL FROM A FIRST STATE TO A SECOND STATE, includes detecting a first transition 58 of the EST signal 40 from a first state 50 to a second state 52. The transition of the EST signal 40 and the delayed EST signal 78 may be detected by detecting a change in an electrical characteristic of the EST signal 40 or delayed EST signal 78, such as voltage, current, or frequency by electronic circuitry within the controller 36.

STEP 118, DETECT A FIRST TRANSITION OF THE DELAYED EST SIGNAL FROM A FIRST STATE TO A SECOND STATE is an optional step that includes detecting a first transition 82 of the delayed EST signal 78 from a first state 50 to a second state 52.

STEP 120, SWITCH THE FIRST SWITCH TO THE CONDUCTIVE STATE, includes switching the first switch 34 to the conductive or "on" state. According to one embodiment of the method 100, the first switch 34 may be switched to the conductive state only when both the EST signal 40 and the delayed EST signal 78 are in the second state 52.

STEP 122, DETECT A SECOND TRANSITION OF THE EST SIGNAL FROM THE SECOND STATE TO THE FIRST STATE, includes detecting a second transition 60 of the EST signal 40 from the second state 52 to the first state 50 after the elapse of a first time period 62 that is between 1 and 5 ms.

STEP 124, DETECT A SECOND TRANSITION OF THE DELAYED EST SIGNAL FROM THE SECOND STATE TO THE FIRST STATE, is an optional step that includes detecting a second transition 84 of the delayed EST signal 78 from the second state 52 to the first state 50 when the first time period 62 has elapsed.

STEP 126, SWITCH THE FIRST SWITCH TO THE NON-CONDUCTIVE STATE AFTER THE SECOND TRANSITION, includes switching the first switch 34 to the non-conductive or "off" state after the second transition 60 of the EST signal 40. According to one embodiment of the method 100, the first switch 34 may be switched to the non-conductive state only after both the EST signal 40 and the delayed EST signal 78 return to the first state 50.

STEP 128, DETECT A THIRD TRANSITION OF THE EST SIGNAL FROM THE FIRST STATE TO THE SECOND STATE, includes detecting a third transition 66 of the EST signal 40 from the first state 50 to the second state 52 after the elapse of a second time period 64 after the second transition 60 of the EST signal 40. The second time period 64 may be between about 250 to 300 μs.

STEP 130, DETECT A FOURTH TRANSITION OF THE EST SIGNAL FROM THE SECOND STATE TO THE FIRST STATE, includes detecting a fourth transition 68 of the EST signal 40 from the second state 52 to the first state 50 when a third time period 70 has elapsed. The third time period 70 may be about 50 μs.

STEP 132, DETECT A THIRD TRANSITION OF THE DELAYED EST SIGNAL FROM THE FIRST STATE TO THE SECOND STATE, is an optional step that includes detecting a third transition 86 of the delayed EST signal 78 from the first state 50 to the second state 52 after the second time period 64 has elapsed for the delayed EST signal 78.

STEP 134, DETECT A CURRENT IN THE PRIMARY COIL, is an optional step that includes detecting a current in the primary coil 22. The primary current 32 in the coil may be detected by a resistor 76 in the primary coil 22 along with a voltage detection circuit within the controller 36.

STEP 136, SWITCH THE SECOND SWITCH TO THE NON-CONDUCTIVE STATE WHEN THE CURRENT IN THE PRIMARY COIL EXCEEDS A CURRENT THRESHOLD, is an optional step that includes switching the second switch 42 to the non-conductive state when the primary current 32 in the primary coil 22 exceeds a current threshold. This step may prevent the battery 12 from being inadvertently shorted to ground if both first and second switches 34, 42 were in a conductive state.

STEP 138, SWITCH THE SECOND SWITCH TO THE CONDUCTIVE STATE AFTER THE FOURTH TRANSITION OF THE EST SIGNAL, includes switching the second switch 42 to the conductive state after the fourth transition 68 of the EST signal 40. According to one embodiment of the method 100, the second switch 42 may be switched to the conductive state after the fourth transition 68 of the EST signal 40 and after the third transition 86 of the delayed EST signal 78. According to another embodiment of the method 100, the second switch 42 may be switched to the conductive state after the third transition 86 of the delayed EST signal 78 only when the EST signal 40 is in the first state 50.

STEP 140, SWITCH THE SECOND SWITCH TO THE NON-CONDUCTIVE STATE AFTER A FOURTH TIME PERIOD HAS ELAPSED, includes switching the second switch 42 to the non-conductive state after a fourth time period 72 has elapsed. The fourth time period 72 may be 1 to 2 ms or longer.

Figure 6:
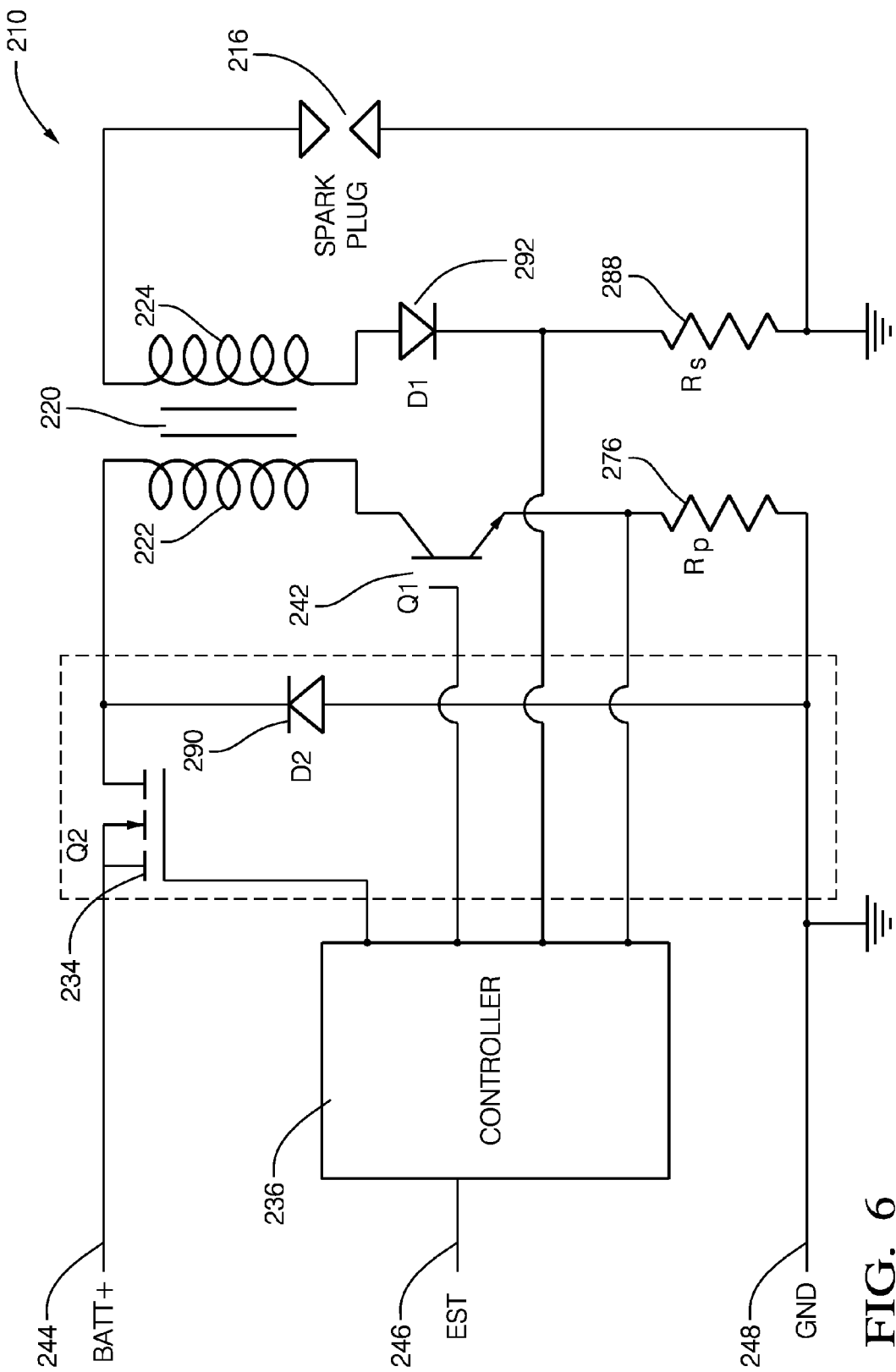
FIG. 6 is an electrical schematic diagram of an ignition coil system accordance with a second embodiment.

FIG. 6 illustrates an alternative example of a controller 236 and first and second switching circuits 234, 242 for an ignition coil system 210, having the same primary coil 22, secondary coil 24, core 20, case 28, and housing 30 as system 10. According to this alternative example, the first switch 234 is intermediate the battery 12 and the primary coil 22 and the second switch 242 is intermediate the primary coil 22 and ground. This system 210 also includes a second resistor 288 connected to the secondary coil 24 and the controller 236 so that the controller 236 can determine the secondary current. This embodiment further includes a primary diode 290 in the primary coil 22 circuit and a secondary diode 292 in the secondary coil 24 circuit.

The controller 236 may also be configured to control both the first switch 234 and the second switch 242 based on the same single EST signal 40 as system 10 rather than a separate signal to control the first switch 234 and a separate signal to control the second switch 242. As shown in FIG. 6, the ignition coil system 210 only requires three inputs, BATT+ input 244 connected to the battery 12, EST input 246 carrying the EST signal 40 and connected to the engine sensor or ECU, and GND input 248 connected to the electrical ground. Therefore, similar to system 10 shown in FIG. 2A, the ignition coil system 210 also only requires three electrical terminals.

Referring again to FIG. 4, the EST signal 40 transitions from a first (e.g. low voltage) state 50 to a second (e.g. high voltage) state 52. The EST signal 40 has pulses having two different durations. The first longer duration pulse 54 controls the first switch 234 and second switch 242 while the second shorter duration pulse 56 controls the second switch 242. The controller 236 detects a first transition 58 of the EST signal 40 from the first state 50 to the second state 52 and detects a second transition 60 of the EST signal 40 from the second state 52 to the first state 50 when the first time period 62 of the first pulse 54 has elapsed, e.g. 1 to 5 milliseconds (ms). The controller 236 switches the first switch 234 and the second switch 242 on after the first transition 58 of the EST signal 40 and the controller 236 switches the first switch 234 and the second switch 242 off after the second transition 60 of the EST signal 40.

If, within the second time period 64 following the second transition 60 of the EST signal 40, the controller 236 detects a third transition 66 of the EST signal 40 from the first state 50 to the second state 52 and a fourth transition 68 of the EST signal 40 from the second state 52 to the first state 50 when the third time period 70 of the second pulse 56 has elapsed, the controller 236 will switch the second switch 242 on after the fourth transition 68 of the EST signal 40 and the controller 236 switches the second switch 242 off after the fourth time period 72 has elapsed. When the second switch 242 is on, the secondary current will induce a primary current in the primary coil 22 that will flow through the primary diode 290. If the controller 236 does not detect the third and fourth transitions 66, 68 of the EST signal 40 within the second time period 64, the second switch 242 remains off.

After the fifth time period 74 following the second transition 60 of the EST signal 40, for example 10 to 15 ms, the controller 236 is enabled to detect another first transition 58 of the EST signal 40.

The controller 236 may also be configured to produce a delayed EST signal 78 and process the EST signal 40 and delayed EST signal 78 similarly to controller 36 of system 10.

The system 210 offers the advantage of the first and second switches 234, 242 and the primary diode 290 can be rated to withstand relatively low voltages, i.e. less than 40 volts rather than higher voltages, e.g. 400 volts or higher.

Accordingly, an ignition coil system 10, 210 that has an output with high initial current and long spark duration is provided. The ignition coil system 10 includes a circuit that can limit the duration of the spark to minimize spark plug electrode erosion. The circuit is controlled by a controller 36 that is capable of controlling two different switching circuits 34, 42 to limit spark duration based on a single electronic spark timing signal 40.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An ignition coil system configured for use with a spark ignition internal combustion engine, comprising:
   a central core;
   a primary wire coil wound about the central core;
   a secondary wire coil wound about the central core;
   a first switching circuit electrically connected to the primary wire coil and configured to be connected to an electrical power source, wherein a first electrical current from the electrical power source flows through the primary wire coil when the first switching circuit is in a conductive state and the first electrical current does not flow through the primary wire coil when the first switching circuit is in a non-conductive state;
   a second switching circuit electrically connected to the primary wire coil, wherein a second electrical current is induced in the primary wire coil by a third current in the secondary wire coil when the first switching circuit is in a non-conductive state and the second switching circuit is in a conductive state, thereby reducing the third current in the secondary wire coil; and
   a controller in communication with the first and second switching circuits, said controller configured to receive a single switching signal and to control the conductive states and the non-conductive states of the first and second switching circuits based on said single switching signal.

2. The ignition coil system in accordance with claim 1, wherein the central core has a generally cylindrical shape and is formed of laminated electrical steel.

3. The ignition coil system in accordance with claim 2, wherein the electrical steel is electrical silicon steel.

4. The ignition coil system in accordance with claim 2, further comprising a magnetic return path at least partially surrounding the central core, the primary wire coil, and the secondary wire coil are formed of a material having a relative magnetic permeability value between 100 and 500, and wherein a portion of the magnetic return path is in direct and intimate contact with each end of the central core.

5. The ignition coil system in accordance with claim 4, wherein the magnetic return path is formed of a composite iron material consisting essentially of iron particles and a dielectric binder.

6. The ignition coil system in accordance with claim 5, wherein the composite iron material consists essentially of 98% iron particles and 2% dielectric binder by weight.

7. The ignition coil system in accordance with claim 6, wherein the dielectric binder is an epoxy resin.

8. An ignition coil system configured for use with a spark ignition internal combustion engine, comprising:
   a central core;
   a primary wire coil wound about the central core;
   a secondary wire coil wound about the central core;
   a first switching circuit electrically connected to the primary wire coil and configured to be connected to an electrical power source, wherein a first electrical current from the electrical power source flows through the primary wire coil when the first switching circuit is in a conductive state and the first electrical current does not flow through the primary wire coil when the first switching circuit is in a non-conductive state;
   a second switching circuit electrically connected to the primary wire coil, wherein a second electrical current is induced in the primary wire coil by a third current in the secondary wire coil when the first switching circuit is in a non-conductive state and the second switching circuit is in a conductive state, thereby reducing the third current in the secondary wire coil; and
   a controller in communication with the first and second switching circuits, said controller configured to receive a single switching signal and to control the conductive states and the non-conductive states of the first and second switching circuits based on said single switching signal;
   wherein the controller is configured to determine a first transition of the single switching signal from a first state to a second state and determine a second transition of the single switching signal from the second state to the first state when a first time period has elapsed,
   wherein the controller switches the first switching circuit to the conductive state after the first transition and the controller switches the first switching circuit to the non-conductive state after the second transition,
   wherein the controller is configured to determine a third transition of the single switching signal from the first state to the second state when a second time period has elapsed and determine a fourth transition of the single switching signal from the second state to the first state when a third time period has elapsed, and
   wherein the controller switches the second switching circuit to the conductive state after the fourth transition and the controller switches the second switching circuit to the non-conductive state after a fourth time period has elapsed.

9. The ignition coil system in accordance with claim 8, wherein the first time period is twenty to eighty times longer than the third time period.

10. The ignition coil system in accordance with claim 8, wherein the controller is configured to produce a delayed switching signal based upon the single switching signal that is time delayed relative to the single switching signal by a fifth time period,
wherein the controller is configured to determine a first transition of the delayed switching signal from a first state to a second state and determine a second transition of the delayed switching signal from the second state to the first state when the first time period has elapsed,
wherein the controller switches the first switching circuit to the conductive state when the single switching signal and the delayed switching signal are in the second state and the controller switches the first switching circuit to the non-conductive state after the single switching signal and the delayed switching signal return to the first state,
wherein the controller is configured to determine a third transition of the delayed switching signal from the first state to the second state when the second time period has elapsed, and
wherein the controller switches the second switching circuit to the conductive state after the fourth transition of the single switching signal and after the third transition of the delayed switching signal and the controller switches the second switching circuit to the non-conductive state after the fourth time period has elapsed.

11. The ignition coil system in accordance with claim 10, wherein the controller switches the second switching circuit to the conductive state after the third transition only when the single switching signal is in the first state.

12. The ignition coil system in accordance with claim 8, wherein the controller is configured to determine a current in the primary wire coil and wherein the controller switches the second switching circuit to the non-conductive state when the current in the primary wire coil exceeds a current threshold.

13. A method of controlling an ignition coil system configured for use with a spark ignition internal combustion engine, said ignition coil system having a central core, a primary wire coil wound about the central core, a secondary wire coil wound about the central core, a first switching circuit electrically connected to the primary wire coil and an electrical power source, wherein a first electrical current from the electrical power source flows through the primary wire coil when the first switching circuit is in a conductive state and the first electrical current does not flow through the primary wire coil when the first switching circuit is in a non-conductive state, a second switching circuit electrically connected to the primary wire coil, wherein a second electrical current is induced in the primary wire coil by a third current in the secondary wire coil when the first switching circuit is in a non-conductive state and the second switching circuit is in a conductive state, thereby reducing the third current in the secondary wire coil, and a controller in electrical communication with the first and second switching circuits, said controller configured to receive a single switching signal and to control the conductive states and the non-conductive states of the first and second switching circuits based on said single switching signal, said method comprising the steps of:
providing said ignition coil system;
providing said single switching signal to said ignition coil system;
detecting a first transition of the single switching signal from a first state to a second state;
switching the first switching circuit to the conductive state;
detecting a second transition of the single switching signal from the second state to the first state after the elapse of a first time period;
switching the first switching circuit to the non-conductive state after the second transition;
detecting a third transition of the single switching signal from the first state to the second state after the elapse of a second time period;
detecting a fourth transition of the single switching signal from the second state to the first state when a third time period has elapsed;
switching the second switching circuit to the conductive state after the fourth transition; and
switching the second switching circuit to the non-conductive state after a fourth time period has elapsed.

14. The method in accordance with claim 13, wherein the first time period is twenty to eighty times longer than the third time period.

15. The method in accordance with claim 13, wherein the steps are performed in the order listed.

16. The method in accordance with claim 13, further comprising the steps of:
producing a delayed switching signal based upon the single switching signal that is time delayed relative to the single switching signal by a fifth time period;
detecting a first transition of the delayed switching signal from a first state to a second state;
switching the first switching circuit to the conductive state when the single switching signal and the delayed switching signal are in the second state;
detecting a second transition of the delayed switching signal from the second state to the first state when the first time period has elapsed;
switching the first switching circuit to the non-conductive state after the single switching signal and the delayed switching signal return to the first state;
detecting a third transition of the delayed switching signal from the first state to the second state when the second time period has elapsed;
switching the second switching circuit to the conductive state after the fourth transition of the single switching signal and after the third transition of the delayed switching signal; and
switching the second switching circuit to the non-conductive state after the fourth time period has elapsed.

17. The method in accordance with claim 16, wherein the steps are performed in the order listed.

18. The method in accordance with claim 16, wherein the second switching circuit is switched to the conductive state after the third transition of the delayed switching signal only when the single switching signal is in the first state.

19. The method in accordance with claim 13, further comprising the steps of:
detecting a current in the primary wire coil; and
switching the second switching circuit to the non-conductive state when the current in the primary wire coil exceeds a current threshold.

20. An ignition coil configured for use with a spark ignition internal combustion engine, comprising:
a central core;
a primary wire coil wound about the central core;
a secondary wire coil wound about the central core; and a magnetic return path at least partially surrounding the central core, the primary wire coil, and the secondary wire coil are formed of a material having a relative magnetic permeability value between 100 and 500, and wherein a portion of the magnetic return path is in direct and intimate contact with each end of the central core having no air gap.

21. The ignition coil in accordance with claim 20, wherein the central core has a generally cylindrical shape and is formed of laminated electrical steel.

22. The ignition coil in accordance with claim 21, wherein the electrical steel is electrical silicon steel.

23. The ignition coil in accordance with claim 20, wherein the magnetic return path is formed of a composite iron material consisting essentially of iron particles and a dielectric binder.

24. The ignition coil in accordance with claim 23, wherein the composite iron material consists essentially of 98% iron particles and 2% dielectric binder by weight.

25. The ignition coil in accordance with claim 24, wherein the dielectric binder is an epoxy resin.

\* \* \* \* \*